United States Patent [19]

Serber

[11] Patent Number: 5,460,427
[45] Date of Patent: Oct. 24, 1995

[54] SEAT ASSEMBLY AND METHOD

[76] Inventor: Hector Serber, 200 Gate 5 Rd., Suite 211, Sausalito, Calif. 94965

[21] Appl. No.: 119,713

[22] Filed: Sep. 9, 1993

Related U.S. Application Data

[63] Continuation of Ser. No. 894,160, Jun. 1, 1992, Pat. No. 5,244,252, which is a continuation of Ser. No. 604,134, Oct. 29, 1990, abandoned.

[51] Int. Cl.$^6$ ...................................................... A47C 1/02
[52] U.S. Cl. .................................. 297/216.19; 297/216.1; 297/216.15; 297/282; 297/284.7; 297/411.41; 297/316
[58] Field of Search ...................................... 297/276, 282, 297/284.7, 284.4, 320, 411.36, 216.15–216.20

[56] References Cited

U.S. PATENT DOCUMENTS

| | | | |
|---|---|---|---|
| 2,024,170 | 12/1935 | Kruse | 257/411.36 X |
| 2,102,979 | 12/1937 | Smith . | |
| 2,736,566 | 2/1956 | Hartl | 297/216.15 |
| 2,922,461 | 1/1960 | Braun | 297/216.15 |
| 3,357,736 | 12/1967 | McCarthy | 294/216.15 |
| 3,610,679 | 10/1971 | Amato . | |
| 3,998,291 | 12/1976 | Davis . | |
| 4,085,963 | 4/1978 | Bullerdieck | 297/216.2 X |
| 4,383,714 | 5/1983 | Ishida | 297/325 |
| 4,650,249 | 3/1987 | Serber . | |
| 4,790,599 | 12/1988 | Goldman | 297/282 X |
| 5,022,707 | 6/1991 | Beauvais et al. . | |
| 5,244,252 | 9/1993 | Serber | 297/216.19 |

FOREIGN PATENT DOCUMENTS

| | | | |
|---|---|---|---|
| 537159 | 4/1955 | Belgium . | |
| 1430028 | 3/1969 | Germany | 297/216.15 |

*Primary Examiner*—Peter A. Aschenbrenner
*Attorney, Agent, or Firm*—Flehr, Hohbach, Test, Albritton & Herbert

[57] ABSTRACT

A seat assembly for a vehicle which includes a seat, a seat back, and mounting means mounting the seat for movement in fore and aft directions in the vehicle along an upwardly concaved arcuate path. The arcuate path has a radius of curvature which is sufficiently large to timely move in front of and to contain the person's buttocks, to significantly slow the rate of deceleration of the person seated on said seat, and being sufficiently small to convert a portion of the linear momentum of the person's buttocks to angular momentum thus maintaining frictional contact of the person's buttocks with the seat during stopping at a high rate of deceleration. A seat assembly which includes a lower lumbar support member that is coupled from movement in response to pelvic tilting movement of the seat also is shown. The method includes the step of employing a seat mounted for movement along an upwardly concaved, arcuate path in the fore-aft direction in a vehicle to effect reduction of injury of a person seated on the seat during a frontal collision of the vehicle with an object.

7 Claims, 10 Drawing Sheets

SEAT ASSEMBLY AND METHOD

This is a continuation of application Ser. No. 07/894,160 filed Jun. 1, 1992, now U.S. Pat. No. 5,244,252, which was a continuation of application Ser. No. 07/604,134 filed Oct. 29, 1990, now abandoned.

TECHNICAL FIELD

The present invention relates, in general, to seat assemblies for motor vehicles and other for other seating applications, and more particularly, relates to seat assemblies which are moveable along an upwardly concaved, arcuate path.

BACKGROUND ART

Considerable effort has been directed toward the development of apparatus for increasing the safety of drivers and passengers when an automobile is involved in a head-on collision. For example, various passive restraint devices, such as lap shoulder belts, have been devised for use alone or together, or in combination with safety devices such as air bags and cushioned dashboard assemblies. While such safety equipment has increased vehicle safety dramatically, still submarining, the effect of the body sliding away from the seat, is a hazard, and many automobiles are not equipped with air bags because of the cost involved, and the use of seatbelts by both drivers and passengers is sporadic and often neglected.

In most instances involving a frontal crash of a motor vehicle there is a tendency for the vehicle to pivot upwardly about the front end of the vehicle. This action causes unweighting of the occupants so that their weight no longer presses their buttocks against the seat. In most crashes, therefore, the people riding in the automobile break away from the seats on which they are sitting and essentially are free to move forward while the vehicle rapidly decelerates. If passive belt restraints or airbags are employed, the upper body of the person will be stopped and become a pivot point for the body. Since a person's lower body has little or no contact and friction force with the seat, however, there is a tendency for the legs and lower body of the passenger to continue forward unrestrained and with the momentum which the person had immediately prior to the crash. The result can be submarining of a person's body out from under the passive restraints as the momentum of the mass of the lower body continues in the forward direction. This tendency is further aided by the natural reaction of a person to pull their slightly bent legs up toward their chest in a panic stop or crash. The result can be severe injury by reason of driving of the person's legs up into the dashboard assembly and/or steering column.

Studies of the dynamics of movement of a person's body during an automobile crash have often been based upon assumptions which in fact are not sound. The human body is, for example, quite flexible and does not act as a unit during rapid deceleration, particularly if only a portion of the body is restrained. It is highly desirable, therefore, to effect a controlled deceleration of substantially the entire mass of vehicle passenger, preferably at a rate which is not as high as the deceleration rate of a vehicle, during a crash.

In addition to issues of safety, any seating assembly is desirably designed so as to be comfortable to sit in under normal conditions for prolonged periods of time. A highly effective seat assembly for enhancing comfort during prolonged seating is the assembly disclosed in my U.S. Pat. No. 4,650,249 in which the seat is mounted for movement along an upwardly concaved arcuate path. Such a path allows the user to continuously balance his or her posture while seated on the chair. The seating system of U.S. Pat. No. 4,650,249 restores mobility and eliminates deformation of the lumbar spine while seated. It produces uniform pressure distribution across the buttocks and thighs and reduces muscular work to below the fatigue level by keeping the musculo-skeletal system relaxed, and yet dynamic. Such a movable seat counteracts the deadening effect of sitting and restores mobility to the seated user.

The pelvic tilt seat assembly of U.S. Pat. No. 4,650,249, however, is shown as incorporated into a seat assembly which has a torso support platform that is relatively stationary in its vertical position. Thus, when the seat moves along an arcuate path, the torso support will resist vertical torso displacements causes by movement of the seat, unless the user lifts the torso away from, or is not supporting the torso on, such a platform. The pelvic tilt seat of U.S. Pat. No. 4,650,249 is particularly effective, therefore, when incorporated into a stool-like seating assembly without a back or chest support, or when the user is using the seating assembly during the performance of tasks relative to a static environment and while not resting the front or back of his or her torso against a fixed support surface.

Accordingly, it is an object of the present invention to provide a seat assembly for motor vehicles, and for other applications, which has enhanced comfort and further, when employed in a motor vehicle, has enhanced safety.

It is another object of the present invention to provide a seat assembly for a vehicle which will increase the ability to control deceleration of the lower body and legs of a person seated on the seat assembly during a frontal collision.

Another object of the present invention is to provide a seat assembly which will enhance collision safety in conjunction with and even when passive restraint devices are not employed and air bags or the like have not been installed in the vehicle.

Still a further object of the present invention is to provide a seat assembly for a motor vehicle or the like which produces displacement of the legs of a person seated on the same in a manner greatly enhancing safety during a frontal collision of the vehicle.

It is a further object of the present invention to provide a seating assembly and method for support of a person during seating which provides greatly enhanced comfort and a more relaxed and yet dynamic support of the person's musculo-skeletal system during seating.

Still another object of the present invention is to provide an apparatus and method for vehicle seating of individuals which is relatively simple to construct and yet provides substantially enhanced comfort and safety.

Still a further object of the present invention is to provide a safety seating assembly for a vehicle or the like which can be retrofit to existing vehicle seat mounting structures.

It is also an object of the present invention to provide a seat assembly which is durable, reliable in its operation, relatively low in maintenance, and suitable for use in a wide range of environments.

The seat assembly and method of the present invention have other objects and features of advantage which will become apparent from, and are set forth in more detail in, the accompanying drawing and description of the Best Mode of Carrying Out the Invention.

DISCLOSURE OF INVENTION

In one aspect, the seat assembly of the present invention is formed to provide a safety seat assembly for a motor vehicle or the like. The seat assembly includes a seat, and a mounting assembly mounting the seat in a generally horizontal orientation for movement in fore and aft directions along an upwardly concaved path having a radius of curvature which maintains frictional contact between the seat and the person's buttocks during a frontal collision. The radius of curvature of the path is sufficiently small to convert a portion of the linear momentum of the person's buttocks and lower body mass into angular momentum, and is sufficiently large to enable the seat to have time to move in front to contain the person's buttocks to significantly slow the rate of deceleration of the person during stopping of the vehicle.

In another aspect, the seating assembly provides enhanced comfort and includes, briefly, a seat, a mounting assembly mounting the seat in a near horizontal orientation relative to a support surface. The mounting assembly also mounts the seat for movement along an upwardly concaved arcuate path having a center of curvature proximate to center of mass of the person seated on the seat. The seating apparatus further includes a lower back support positioned to engage the person's lower back in the lumbar region and coupled for movement in response to movement of the seat to follow the change in elevation of the seated person's lumbar region as the seat moves along the upwardly concaved arcuate path.

The method of the present invention is comprised, briefly, of the steps of employing a seat mounted for movement in a direction along a fore and aft axis of the vehicle to maintain contact between the person's buttocks and the seat for deceleration of the person's lower body and legs during a panic stop of the vehicle.

BEST MODE OF CARRYING OUT THE INVENTION

Figure 1:
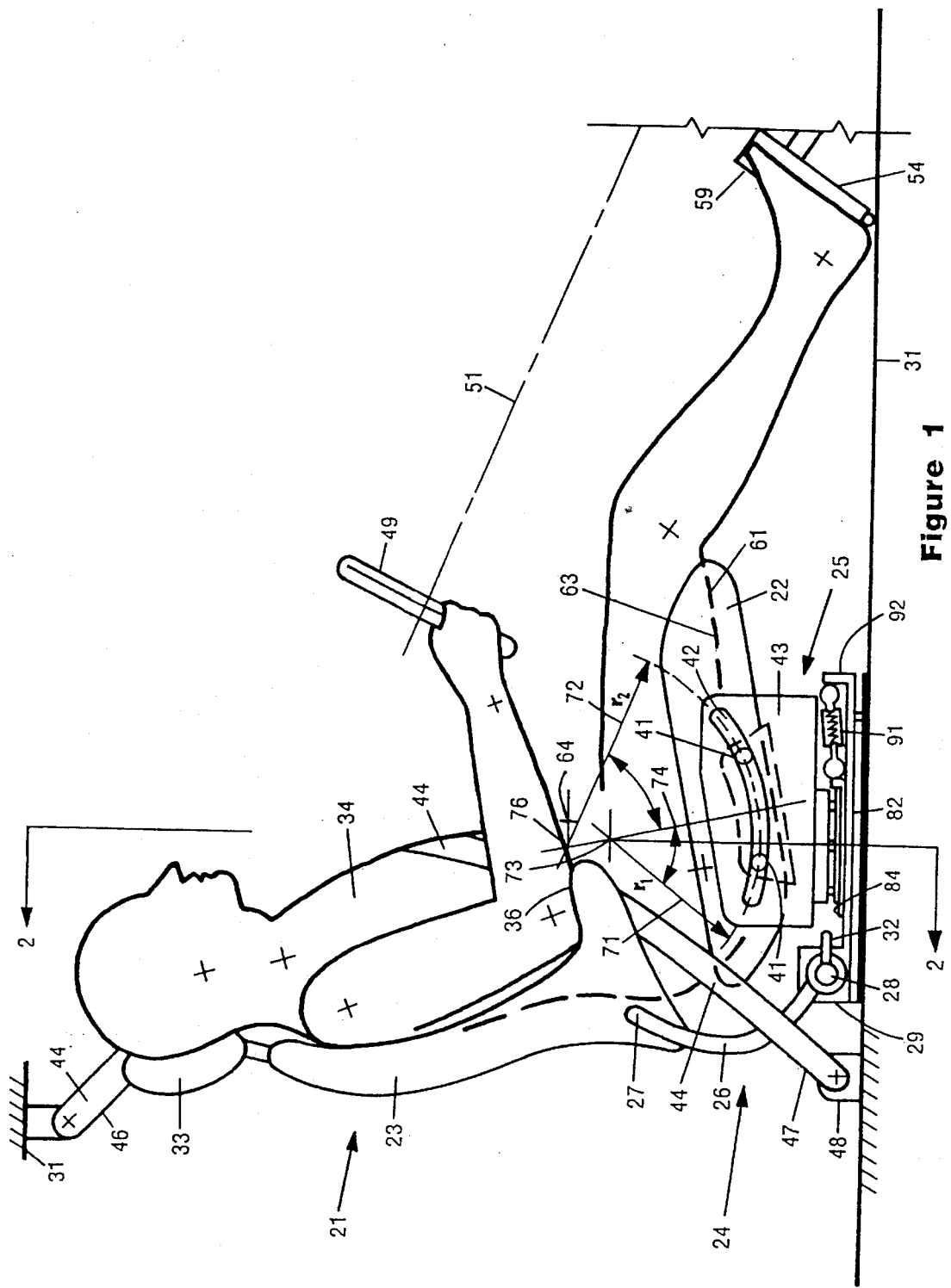
FIG. 1 is a schematic, side elevation view of a seat assembly for a motor vehicle constructed in accordance with the present invention.
Figure 2:
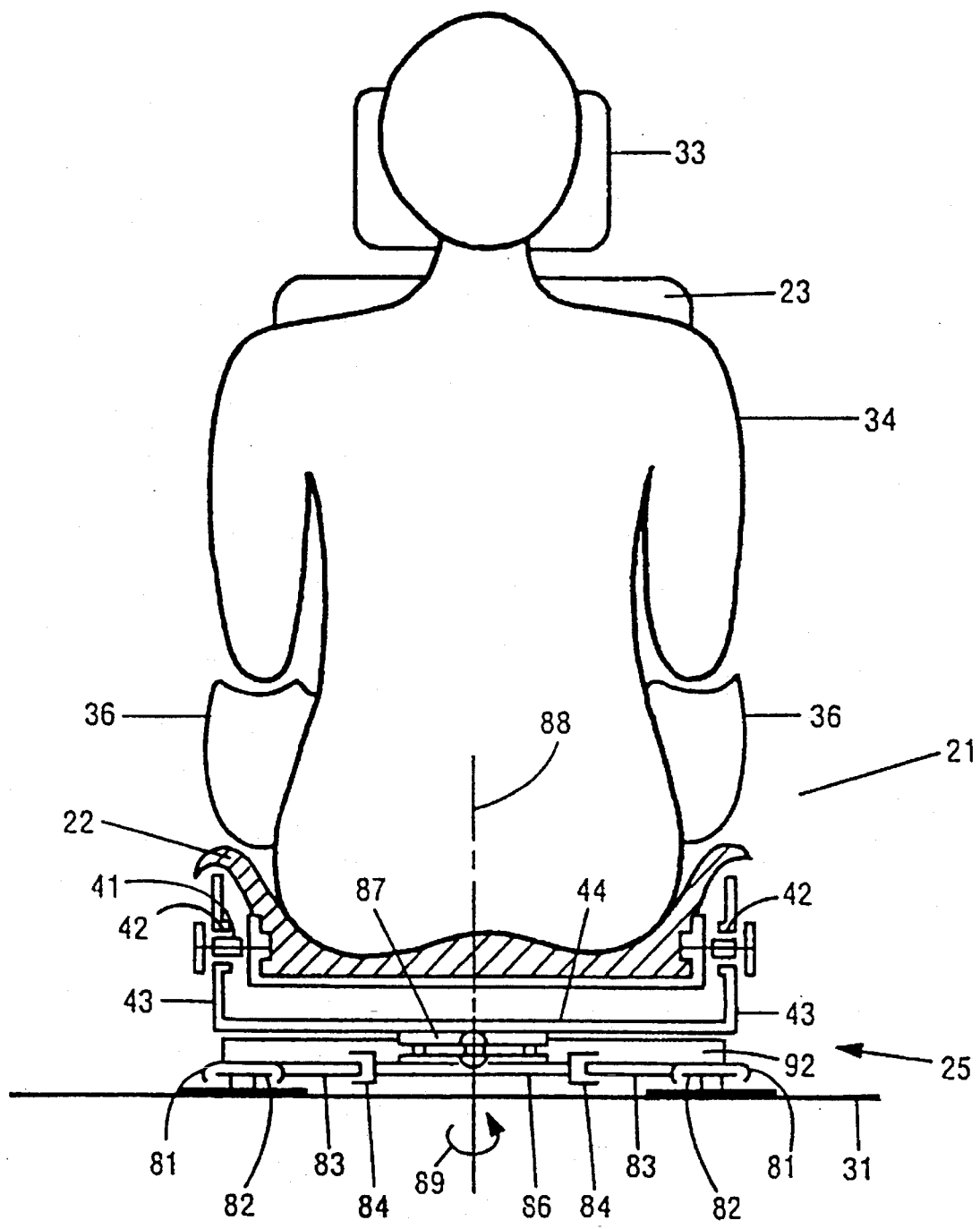
FIG. 2 is a front elevation view, in cross-section, of the seat assembly of FIG. 1, taken substantially along the plane of line 2—2.

In one aspect of the present invention a seat assembly and method is provided which is particularly well suited for enhancing the safety of drivers and passengers in motor vehicles. FIGS. 1 and 2 illustrate one embodiment of the seat assembly which is particularly effective in affording the vehicle driver enhanced safety during frontal collisions.

The seat assembly of FIGS. 1 and 2, generally designated 21, includes a seat 22, seat back 23 and mounting means, generally designated 25, for mounting seat 22 in a substantially horizontal position and mounting means 24 mounting back 23 in a substantially vertical position.

In the illustrated seat assembly, back mounting means 24 includes a back mounting arm 26 which is coupled at end 27 to seat back 23 and is adjustably coupled at 28 to a mounting bracket 29 secured to floor 31 of the vehicle, which is schematically illustrated. The angle of seat back 23 is adjustable by lever 32 in a conventional manner, and the seat back preferably carries a head rest 33 positioned to engage the back of the head of a person 34 seated in the seat assembly. In the form of the back assembly shown in FIGS. 1 and 2, forwardly extending arm rest portions 36 integrally formed with back rest 23 also are provided. The back assembly and mounting means therefor, as illustrated in FIG. 1, however, does not constitute a novel portion of the seat assembly of the present invention.

Enhanced safety during panic stops or collisions is provided in the seat assembly of the present invention by the seat mounting means 25. In the form shown in FIGS. 1 and 2, seat 22 is mounted by laterally projecting seat mounting rods (or by roller elements) 41 positioned in upwardly concaved, arcuate slot 42 in seat frame member 43. As will be seen from FIG. 2, seat frame 43 may be a U-shaped frame with a central portion 44 and two upstanding side portions 43. Thus, seat 22 is guided for arcuate movement along the curve or arcuate path as defined by slots 42, which will be described in more detail hereinafter.

It is broadly known to provide a seat assembly with the seat mounted for movement along an upwardly concaved arcuate path, for example, as is shown in the seat assembly of my U.S. Pat. No. 4,650,249. In my prior patent, however, the mounting of the seat assembly for movement along an arcuate path was employed in order to enhance comfort and reduce long term seating fatigue. In the present invention, the arcuate path provided by slot 42 is oriented along the fore-aft axis of a vehicle and is employed and has a curvature enhancing safety during collision. The seat assembly also provides additional comfort and less user fatigue as compared to conventional vehicle seats.

As is typical in many automobiles, a passive restraint device, such as a shoulder belt 44, may be provided proximate seat 21. Belt 44 has an upper end 46 coupled to vehicle 31 proximate the roof or side wall and a lower end 47 coupled by a mounting flange 48 to the floor of vehicle 31. In the illustrated figures, the seat assembly is used to support a driver who grips steering wheel 49 mounted to a steering column, schematically represented at 51 by a phantom line. It will be understood, however, that the seat assemblies of the present invention also can be used advantageously by vehicle passengers.

Figure 3C:
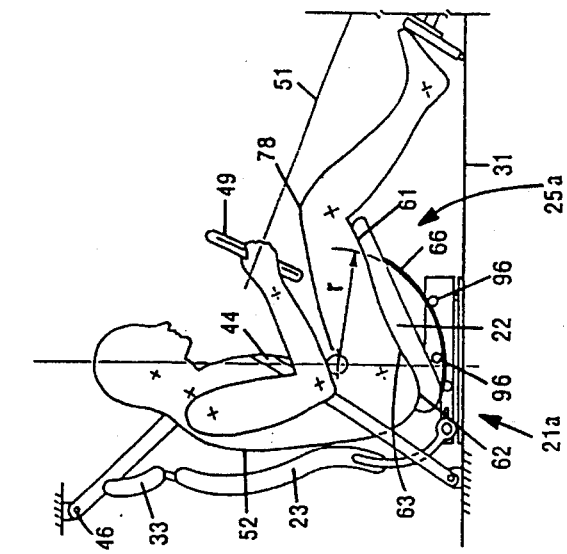
FIG. 3C is a side elevation view corresponding to FIGS. 3A and 3B, showing the seat assembly of the present invention during a frontal collision of the vehicle.
Figure 3B:
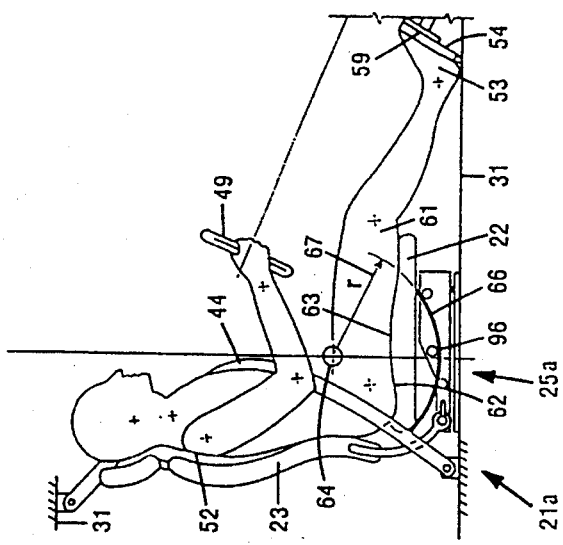
FIG. 3B is a side elevation view corresponding to FIG. 3A, showing the seat assembly of the present invention during normal braking.
Figure 3A:
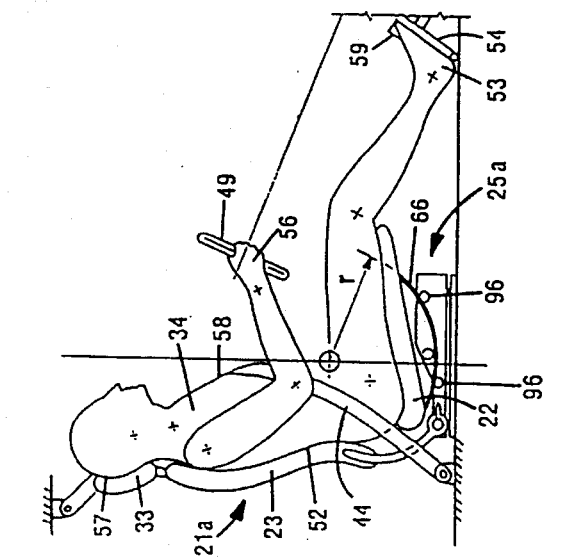
FIG. 3A is a side elevation view, in reduced scale, corresponding to FIG. 1, but showing an alternative embodiment of the seat assembly of the present invention during normal vehicle operation at constant velocity.

The effect of providing a seat 22 which is mounted in a vehicle by seat mounting means 25 for movement along an upwardly concaved, arcuate path can best be understood by reference to FIGS. 3A, 3B and 3C. In FIGS. 3A, 3B and 3C, the seat mounting means 25a is somewhat different from mounting means 25 illustrated in FIGS. 1 and 2. The remaining components of seat assembly 21a, as illustrated in FIGS. 3A—3C, are essentially identical to that of FIGS. 1 and 2, and the mounting means 25a produces the same result as that of mounting means 25 in FIGS. 1 and 2.

In the illustrated embodiment of FIGS. 3A–3C, track 66 along which seat 22 moves is an arcuate track having a center of curvature proximate center of mass 64 of the person seated on the seat. Preferably the center of curvature is coincident with center of mass 64. In FIGS. 3A–3C a single center of curvature is provided for track 66 and the curved path has one radius, r, as indicated by arrow 67. In the seat mounting means 25 of FIGS. 1 and 2, a compound arcuate path is provided in which there is a first radius $r_1$, as indicated by arrow 71, and a second radius $r_2$, as indicated by arrow 72. The radii $r_1$ and $r_2$ have centers of curvature in which the center 73 of radius $r_1$ is located on plane 74 which passes through the center of curvature 76 of the larger radius of curvature $r_2$. This provides a smooth transition from one radius of curvature to the other and has advantages which will be described more fully hereinafter.

In FIG. 3A, the driver 34 is shown in a normal driving position with his back 52 resting against seat back 23 and seat 22 in substantially the position shown in FIG. 1. The driver's foot 53 is on a gas pedal 54 and his hands 56 grip steering wheel 49. The driver's head 57 is proximate or rests against head rest 33, and shoulder belt 44 extends across the driver's chest or torso 58.

In a normal braking mode, as shown in FIG. 3B, the driver moves his foot from the gas pedal to a brake pedal 59 and pushes down on the brake pedal with his foot 53. This action tends to force the driver's braking leg thigh 61 down at the front end of the seat, which causes seat 22 to pivot in a clockwise direction to a near horizontal position. The driver's back 52 pulls away slightly from seat back 23, and belt 44 and the driver's arms restrain forward motion of the driver's torso. In the normal braking mode of FIG. 3, the driver's buttocks 62 and thighs 61 are fully in contact with upper surface 63 of seat 22. The driver's weight, acting through center of mass or gravity 64 of the driver provides a substantial normal force against seat surface 63, and friction resists any tendency of the driver's buttocks and legs to slide forward over seat 63.

In FIG. 3C the dynamics which occur under a collision or extremely high rate of vehicle deceleration are illustrated. When a frontal collision occurs in a vehicle having a conventional seat assembly, there is a tendency for the front end of the car to dive down and the rear end to lift or rotate clockwise up about the front end as the vehicle is rapidly stopped. This causes the driver or passenger to be thrust up and unweighted from the seat during the impact of the collision while the vehicle is decelerating at a very high rate to a stop. The friction between seat upper surface 63 and buttocks 62 and thighs 61 of the person in the seat rapidly drops to a very low value, and perhaps even zero if the user is lifted free of the seat. The dynamics of a frontal collision often are, therefore, to lift the occupants from the seats and cause them simply to be airborne toward the much more rapidly decelerating steering column, dashboard assembly and windshield of the vehicle. The result, of course, can be serious injury or even death.

The presence of passive restraint means, such as shoulder belt 44, causes the upper body or torso of the person to be restrained and decelerated with the vehicle, also causing the body to pivot about this restraint. Usually such deceleration takes place after a little give in the belt system which affords the user some additional distance in which to decelerate his or her upper body, as compared to the shorter distance over which the vehicle is decelerated to a stop. When the person seated in the seat becomes airborne, deceleration of the person's upper body by belt 44 does not control movement or necessarily insure deceleration of the user's mass in his lower body and legs. Thus, there is a tendency under frontal crash conditions in a conventional automobile seat for the lower body and legs to break free of frictional contact with the seat and continue with its pre-collision momentum rapidly forward, notwithstanding deceleration of the user's torso. The result is submarining of the user's legs and lower body underneath belt 44 and up into the steering column 51 and/or under the dashboard assembly of the vehicle. One approach to solving this problem has been to provide both lap and torso belts, but even when installed, such passive restraint devices often are not used. Another approach to this problem has been to provide cushions in areas of the dash assembly which may be impacted, but many vehicles are not constructed in a manner which will permit such cushioning, and particularly the retrofitting of such cushioning to existing vehicles.

Seat assemblies 21 and 21a of the present invention overcome this problem by using the upwardly concaved arcuate path to maintain buttocks 62 and thighs 61 of the driver or passenger in contact with upper surface 63 of the seat when a frontal impact occurs. Seat 22, as shown in FIG. 3C, rotates in a counterclockwise direction from the position of FIG. 3A to the position of FIG. 3C.

As can be seen in FIG. 3C, counterclockwise rotation of seat 22 causes the front end of the seat to rise up in front of the user's thighs 61 in order to maintain contact between the buttocks 62 and thighs 61 with upper surface 63 of the seat. Thus, seat 22 is rapidly repositioned during the impact in a manner which enables seat 22 to be effective in containing and decelerating the passenger's lower body and legs. The buttocks and thighs do not break free of the seat, and accordingly there is significant frictional resistance to movement of the body in a forward direction relative to the seat, which in turn resists submarining under belt 44.

There are several other effects which are highly advantageous and result from mounting seat 22 for movement along an upwardly concaved arcuate path oriented in a fore-aft direction in a vehicle. First, rotation of seat 22 causes linear momentum of the lower body and legs of the driver or passenger to be converted into angular momentum during the deceleration process. Second, the movement along the arcuate path includes forward movement so that the passenger has a greater distance over which to decelerate to a stop than the distance in which the vehicle was stopped. The rate of deceleration of the individual, therefore, is less than the rate of deceleration of the vehicle. Additionally and very importantly, as the seat rotates, the knees 78 are brought up to a position in front of the dashboard assembly and yet behind steering wheel 49. This position preferably also is below steering column 51. This positioning of knees 78 is enhanced by the natural human reaction to lift the already slightly bent knees toward the chest when in a collision. Lastly and very importantly, the tendency for the body to be thrust up from seat 22 is greatly reduced since the counterclockwise rotation of seat 22 counteracts the clockwise rotation of the decelerating vehicle.

In the seat assembly of the present invention, the radius of curvature of the upwardly concave path of the seat should be sufficiently small so as to convert a portion of the linear momentum of the person's buttocks to angular momentum and it should be sufficiently large to cause the seat to rapidly position itself in front of the buttocks during a high rate of vehicle deceleration so as to maintain contact of the person's buttocks with the seat during stopping of the vehicle. The radius of curvature of the upwardly concaved arcuate path conversely should be sufficiently large to afford the seat enough time to get in front of the person's buttocks and should be sufficiently large to slow the rate of deceleration of the person seated on the seat to a rate significantly below the rate of the decelerating vehicle. When passenger restraining means are included the seat mounting means 25a should have a radius of curvature resisting submarining of the person's legs and torso relative to the passenger restraining means during stopping.

It has be found that a radius of curvature greater than about 4 inches and preferably in the range of about 4 to about 15 inches is desired. Most preferably, the radius of curvature is about at the center of mass of a seated person. For most anatomies, that radius of curvature will be about 10 to about 11 inches, with surprisingly little variation from person-to-person within the normal range of adult drivers. The center of mass of a person when seated is approximately at 64, which is close to the center of the lumbar curvature of the person's spine when seated on the seat.

In the form of seat assembly shown in FIGS. 1 and 2, the arcuate path provided by slot 42 is a compound curve in which the radius of the curvature at the aft end of the slot is less than the radius of curvature at the fore end of the slot. During normal driving and conventional stopping, the seat will operate along the smaller radius of curvature, or along a combination of the two radii, as shown in FIG. 1. Upon panic stopping or a collision, a larger radius of curvature at the fore end of the path or slot causes timely tilting of the seat to ensure that the person's buttocks remain in contact with seat surface 63 and that the person's knees are tucked up in front of the dash and under steering wheel 49.

It should be noted that while the seat assembly 21 of the present invention is highly effective in enhancing safety in a frontal collision situation, it also enhances vehicle safety by reducing driver fatigue. Thus, the ability to periodically move the seat along an arcuate path allows the lumbar region of the spine to remain more relaxed and less stressed. This in turn produces less driver fatigue, which enhances driver safety and comfort.

Seat assembly 21 of FIGS. 1 and 2 has additional features which further enhance the safety and ease of use. As best may be seen in FIG. 2, it is preferable that the seat assembly be provided with mounting means 25, which includes a pair of channels 81 that slidably mount to conventional seat mounting rails 82 secured to the floor of vehicle 31. Channels 81 can be spaced from each other in order to enable retrofitting of seat assembly 21 to virtually any vehicle. Extending inwardly from channels 81 are mounting plates 83 which are slidably received inside U-shaped mounting channels 84. A pivotal mounting plate 86 extends between U-shaped channels 84 and carries a pivotal assembly, generally designated 87, which couples U-shaped frame central portion 44 for pivotal movement about vertical axis 88, as indicated by arrow 89. Such pivotal movement facilitates entry and exit from the seat by enabling the same to be pivoted to a position facing the side of a car so that arm rest 36 on the outside of the seat does not impede entry into or exit from the seat.

Additional safety is effected by providing for forward and aft displacement of the entire seat assembly along plates 83 by means of channels 84. As best may be seen in FIG. 1, shock absorber means 91 can be mounted between a stationary flange 92 on the front end of transverse mounting plates 83 and movable plate 86. Shock absorber means 91 preferably is formed so as to resiliently bias plate 86 to a rearward most position with a force which will prevent forward movement of plate 86 and the seat assembly until the acceleration force on the shock absorber exceeds 450 pounds-force. It has been found that spinal injury is highly likely to occur when the spinal column is subjected to a compression force in excess of 495 pounds-force.

The purpose of shock absorber 91, therefore, is to work in combination with the arcuately mounted seat. When seat 22 reaches its maximum forward position as shown in FIG. 3C, continued momentum and deceleration will work against shock absorber 91. The shock absorber will resiliently displace when the deceleration threshold exceeds 450 pounds-force to afford additional distance in which to stop or decelerate the user's lower body and legs. This is made possible by reason of maintaining the good contact between the user's buttocks and the seat as a result of the inclined position of the seat. Thus, the motion is first an arcuate motion until the end of the path is reached, at which point the shock absorber is loaded and displaced forwardly by an additional amount equal to the stroke of the shock absorber. It should also be noted that once the seat is repositioned to the position of FIG. 3C, the resiliency of the seat also inherently affords a shock absorbing effect, which slightly lengthens the distance over which the lower body of the person seated on the seat is stopped.

In FIGS. 1 and 2 the rolling or sliding elements 41 are carried by the seat and moved along a slot 42 carried by the seat frame. In FIGS. 3A–3C the arcuate path is carried by the seat and the rolling or sliding elements 96 are carried by the seat frame or mount. The resulting arcuate motion, however, is quite similar, although in FIGS. 1 and 2 the motion is along an upwardly concaved arcuate path having two radii of curvature that are tangential at the same plane 74.

Figure 4:
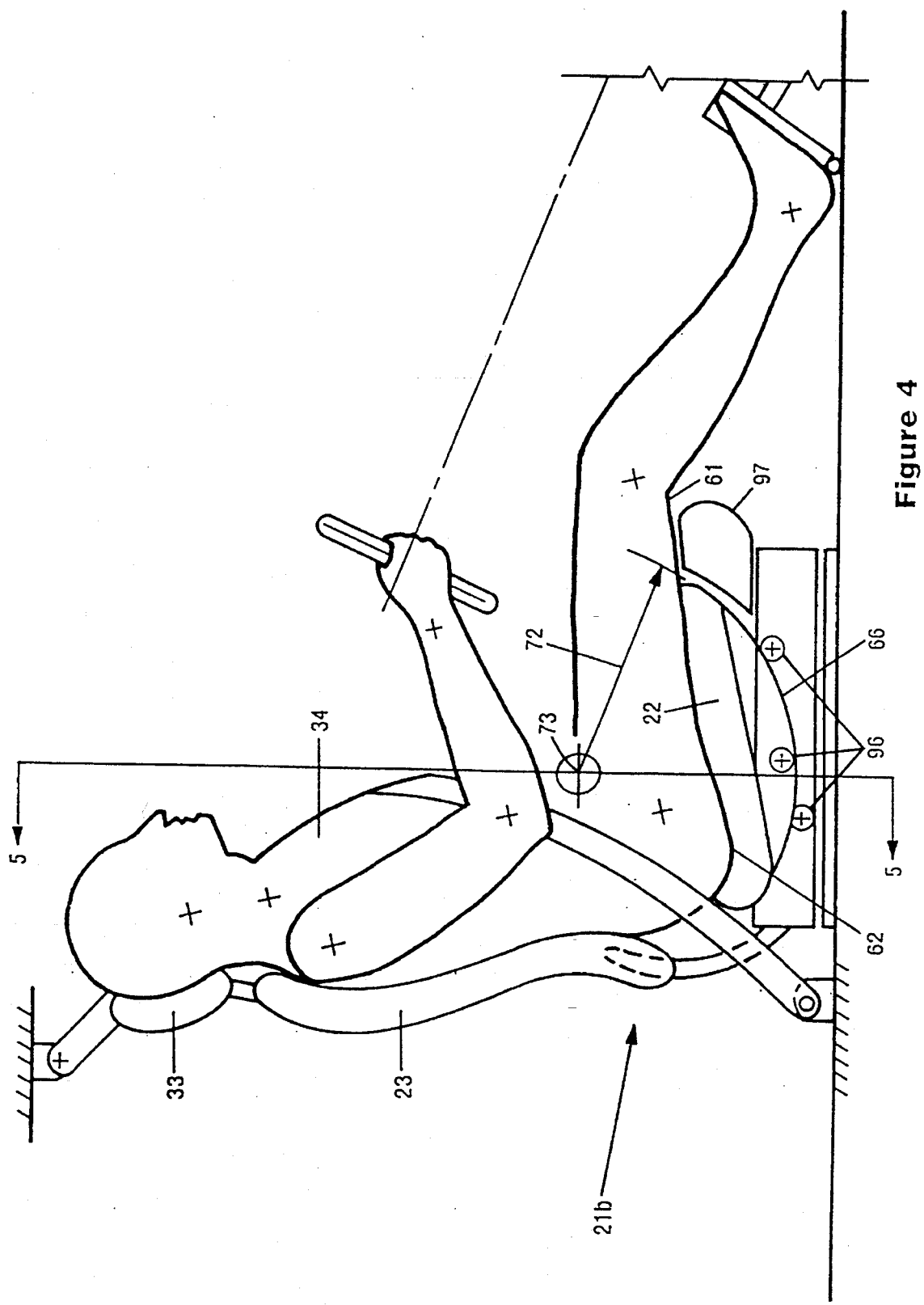
FIG. 4 is an enlarged, schematic, side elevation view of a seat assembly similar to the seat assembly of FIGS. 3A–3C, but showing a modified embodiment thereof.
Figure 5:
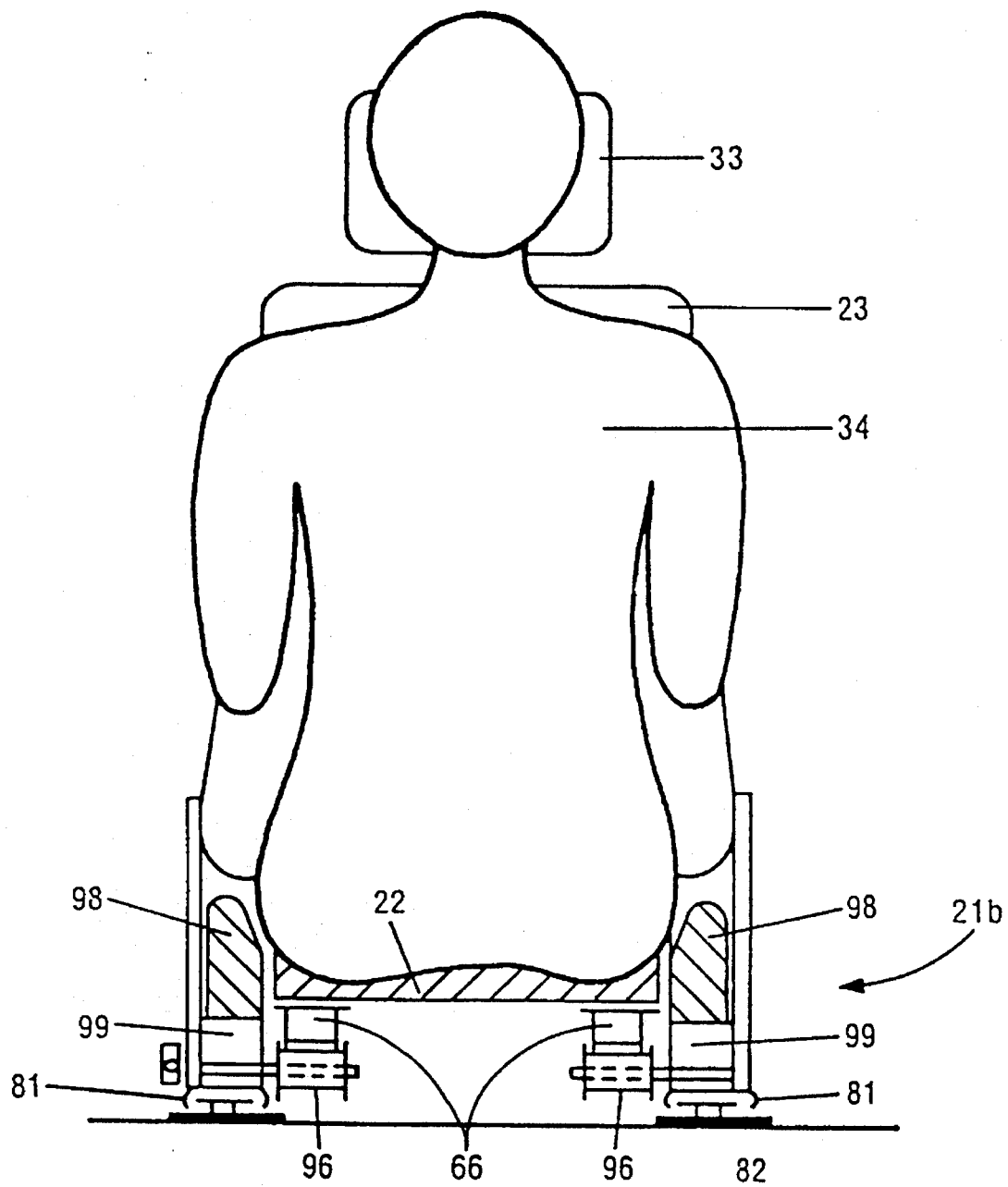
FIG. 5 is a front elevation view, in cross-section, of the seat assembly of FIG. 4, taken substantially along the plane of line 5—5 in FIG. 4.
Figure 6:
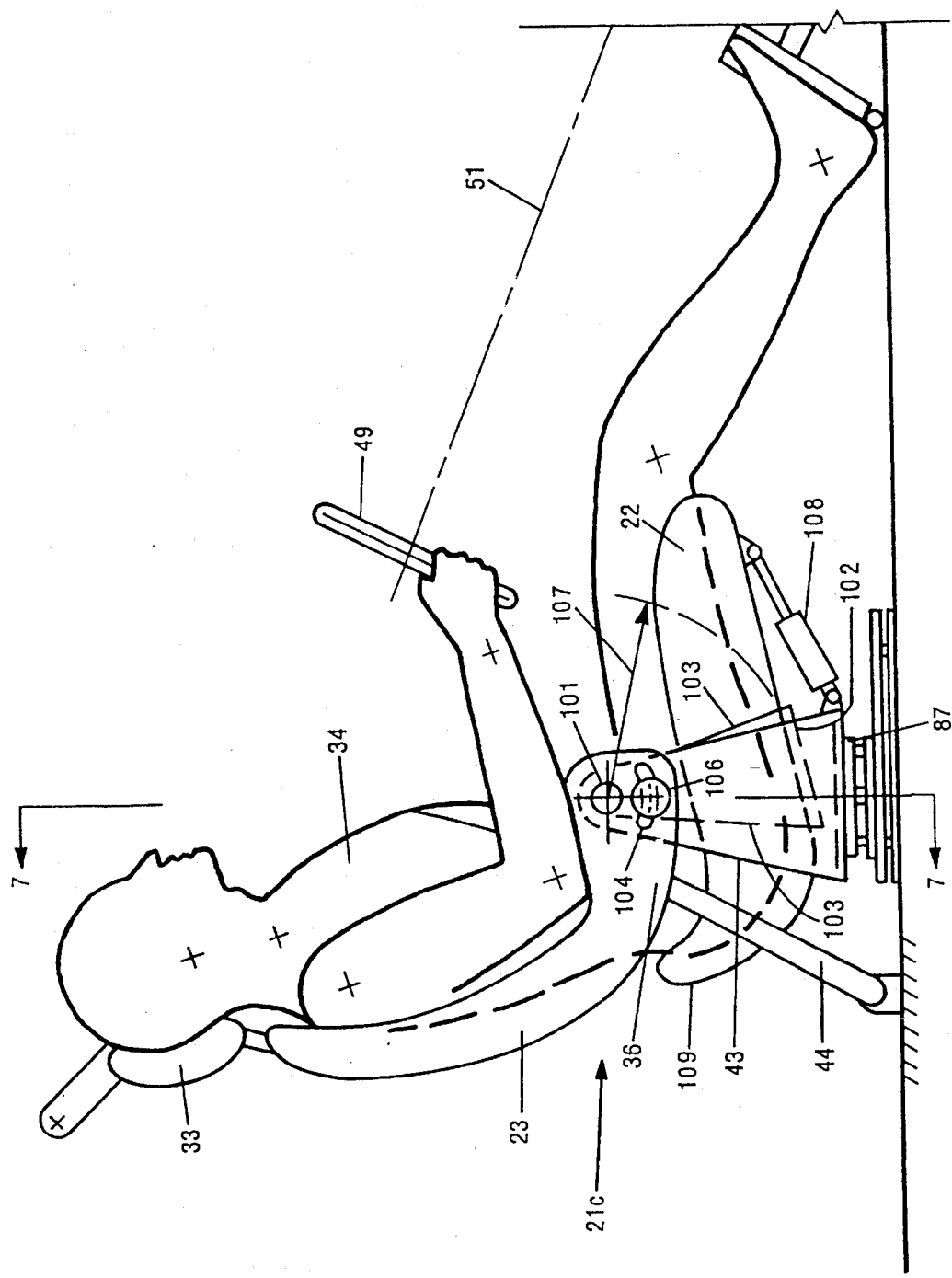
FIG. 6 is a schematic, side elevation view of a further alternative embodiment of the seat assembly of the present invention.
Figure 7:
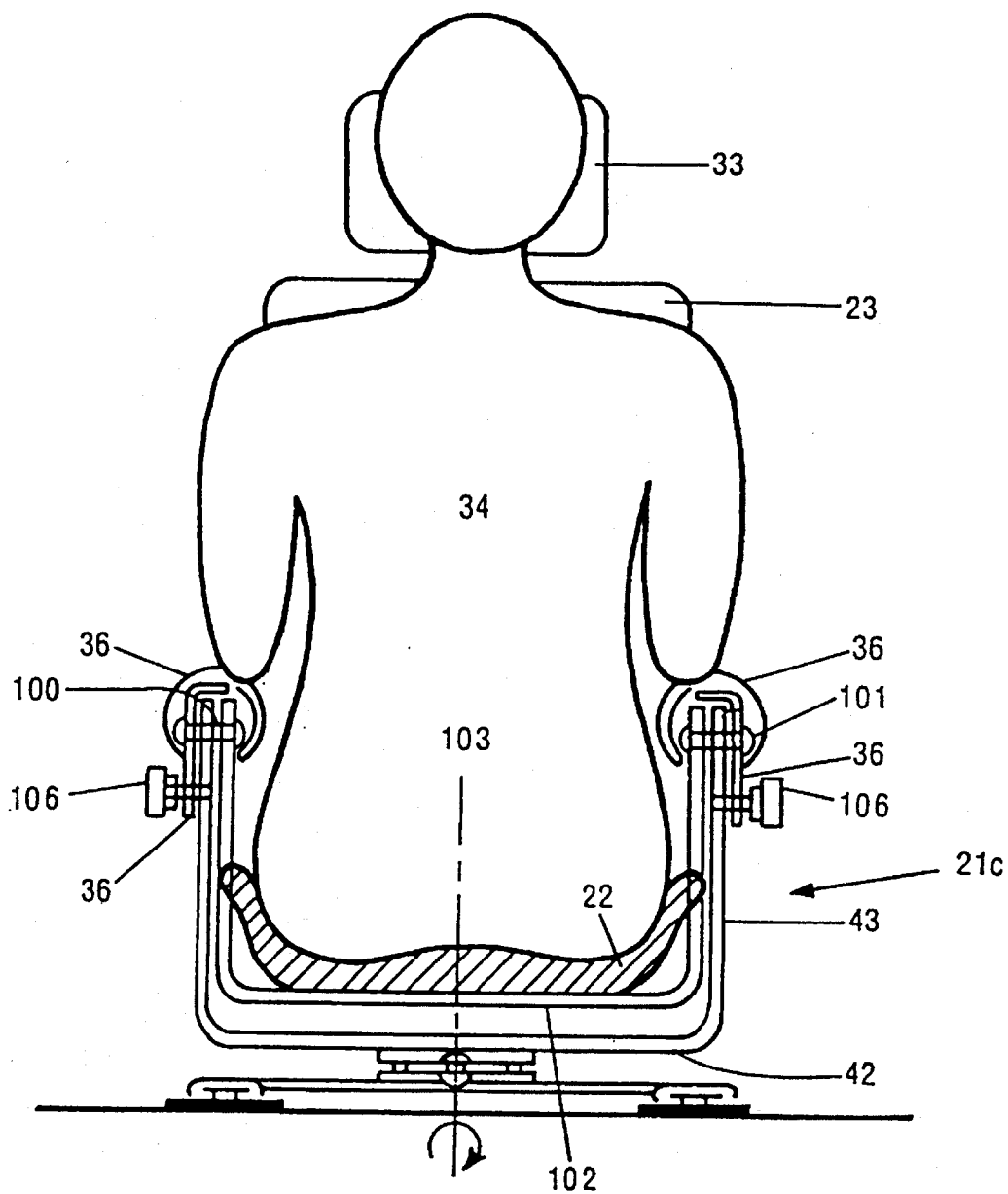
FIG. 7 is a front elevation view, in cross-section, of the seat assembly of FIG. 6, taken substantially along the plane of line 7—7.

In FIGS. 4 and 5, seat assembly 21b is shown, which is very similar in structure to that of seat assembly 21a. Seat 22 is mounted for movement along an upwardly concaved arcuate path by a pair of arcuate rails 66 having a radius of curvature 72 about center of curvature 73, which is located at about the hips, iliac crest of the person's body. A plurality of roller elements 96 engage rail or track 66 to control motion of the seat. Instead of the entire seat pivoting, however, in FIGS. 4 and 5 there is a fixed or stationary front seat portion 97, which engages thighs 61 during normal driving, and stationary side seat portions 98 (see FIG. 5) which are mounted on stationary frame members 99. The portion of seat 22 which is engaged by the person's buttocks 62 is free to rotate in a panic stop. The stationary portions 97 and 98 provide support surfaces during normal driving, which allow the user to adjust the position of seat 22 along curved track 66 so as to better enjoy the anti-fatigue benefits of the seat assembly. Stationary surfaces 97 and 98, however, do not interfere with seat movement during high deceleration stops. Seat assembly 21b does not include armrests on either side of the seat, and accordingly, the seat is not mounted for pivotal movement about a vertically extending axis. assembly 21c of FIGS. 6 and 7 is similar to assembly 21, except that seat 22 is mounted for movement along an upwardly concaved arcuate path by pivoting of the same about horizontally oriented, pivotal mounting pins 101. As was the case for assembly 21, a U-shaped frame having a central portion 44 and side seat support posts 43 are provided. Posts 43 extend upwardly along opposite sides of seat 22 to a position above the seat, and preferably to about 10 or 11 inches above upper surface 63 of the seat so as to position pivot pins at about the center of mass of the person's body. Seat 22 is carried by a seat pan member 102, which also is U-shaped and has sides 103 which extend up to pivot pins 101. In the preferred form, seat back 23 includes integral armrest portions 36 which extend forwardly and are also mounted to support posts 43. In the form illustrated, arm rests 36 also include a slot 104 and a locking knob assembly 106 that allows selective adjustment and locking of the angle at which seat back 23 is mounted with respect to support posts 43.

The operation of seat assembly 21c in a collision situation is similar to that of the previously described embodiments of the present invention. Seat 22 rotates up along an upwardly concaved path about the center of mass by pivot pin 101, as indicated by the radius arrow 107 in FIG. 6. Optionally, the seat assembly is also provided with control means 108 which is coupled between movable seat 22 and fixed frame member 43. Control means 108 can take the form of a spring-loaded piston, a pressurized cylinder with safety release valve which is releasable for movement at collision, or an electric solenoid which is used to modify the free swinging movement which would otherwise occur. Thus, means 108 could be coupled to an accelerometer and used to boost or accelerate seat rotation. It also could be coupled to the same airbag deployment device of the vehicle or to the vehicle's hydraulic system and used by the driver to control hydraulically the angle of the seat during normal operation, while being disengaged on a crash. Similar control means can be incorporated into the seat assemblies previously described.

Additionally, in the seat assembly of FIGS. 6 and 7 seat 22 includes a rear portion 109 which extends around and engages the user's buttocks up to about the lumbar region of the back. As also will be seen, seat 22 extends along the sides of the user's thighs and buttocks to a greater degree than in previous embodiments.

Seat assembly 21c also includes pivotal mounting means 87 pivoting about a vertical access for easy entry and exit from the seat, in light of the arm rests 36. All of seat assemblies 21, 21a, 21b and 21c include a seat 22 mounted for movement along a concaved arcuate path through a range of about 0°, or horizontal, to about a position in which the seat is tilted in the aft direction by about 35°. When a plurality of radii of curvature are employed, for example, in seat assembly 21 of FIGS. 1 and 2, the smaller radius of curvature $r_1$ controls seat movement for orientations between about 0° and about 15° rearward tilt. The second greater radius of curvature $r_2$ controls the seat movement between about 15° rearward tilt to about 35° of rearward tilt.

Figure 8:
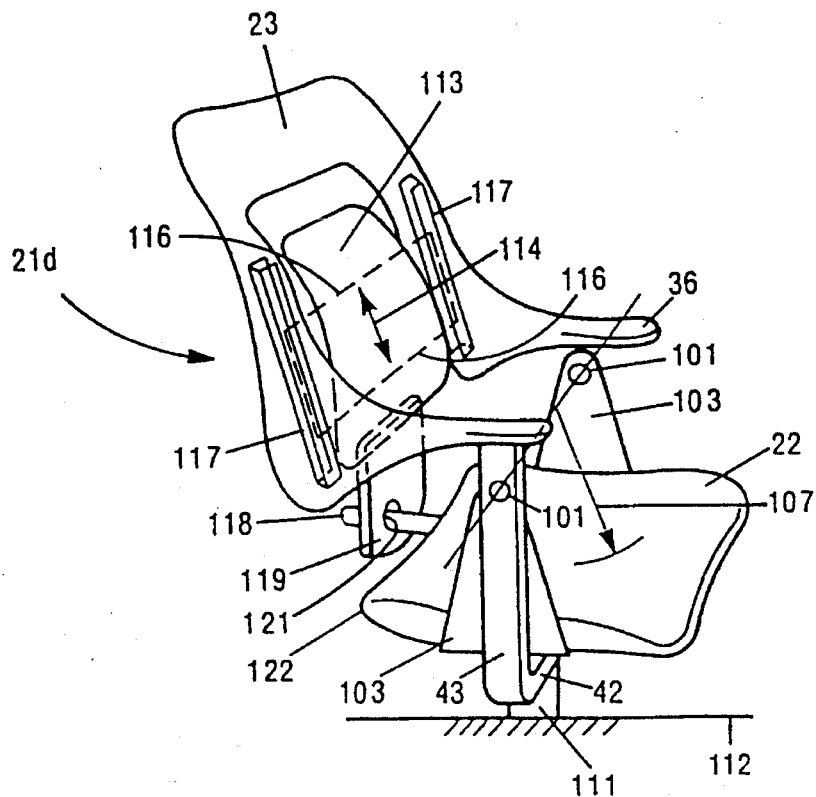
FIG. 8 is a schematic, top perspective view, in reduced scale, of a further alternative embodiment of the seat assembly of the present invention.

In FIG. 8 a further seat assembly 21d, constructed in accordance with the present invention, is shown which may be used either in an automobile or as an office or general purpose non-vehicular chair. Seat assembly 21d is similar to assembly 21c in that seat 22 is mounted for rotation about an upwardly concaved arcuate path by U-shaped seat pan, which has upwardly extending side members 103. Side members 103 are pivoted to seat support posts 43 at pivot pins 101 for arcuate movement, as indicated by the radius of arrow 107. The central portion 42 of the U-shaped mounting of frame is shown in FIG. 8 to be mounted to a central post 111, which in turn is rigidly secured to support surface 112. A pivotal mounting assembly similar to assembly 87 would normally be provided between post 111 and frame portion 42, but is not shown in the drawing.

Rigidly mounted to upwardly extending support post members 43 is a seat back and arm rest assembly which includes armrest 36 and an upper back supporting portion 23. In the improved seating assembly of FIG. 8, a lower back support member 113 is positioned to engage the lumbar region of a person seated on seat 22. Moreover and very importantly, the lower back support 113 is movably mounted and coupled for movement in response to movement of seat 22. Thus, lower back support member 113 follows the change in elevation of the seated person's lumbar region as seat 22 moves along an upwardly concaved arcuate path.

In the preferred form, lower back support 113 is mounted for vertical reciprocation, as indicated by arrow 114, by providing a transversely extending plate-like member 116, which is slidably received in guide members 117 carried in upper back support 23. As will be appreciated, rolling guided movement or sliding guided movement of the lower back support member 113 can be provided.

Coupling of the lumbar support member 113 for movement with seat 22 can be accomplished in various manners. As shown in FIG. 8, lower back support 113 is coupled for movement in response to seat 22 by rod means 118 and follower means 119. Rod 118 extends rearwardly of the seat and follower 119 is provided by an extension on the lower back support member 113. Formed in follower 119 is an opening 121 dimensioned to slidably and pivotably receive the distal end of rod 118.

As seat 22 moves along the arcuate path indicated by arrow 107, rear end 122 of the seat is raised and lowered. This motion is transferred by the rod and follower assembly into reciprocal motion 114 of lumbar support member 113.

The seat assembly of FIG. 8, therefore, has the comfort and fatigue lessening advantages of a pelvic tilt seat, and additionally has the advantage that the lumbar region of the person seated on the seat will be continuously supported without the need for sliding of the person's back relative to the seat back. The lower seat back, instead, follows the lumbar region during movement of the seat.

In addition to providing significantly enhanced comfort and lessened fatigue, the seat of FIG. 8 also can be used in vehicles. The effect is that the downward shifting of lumbar region 113, as seat 22 rotates to an upward position in a panic stop, tends to encourage downward displacement of the user's buttocks and legs to maintain high frictional contact between the buttocks and thighs and the seat during a crash.

Figure 9:
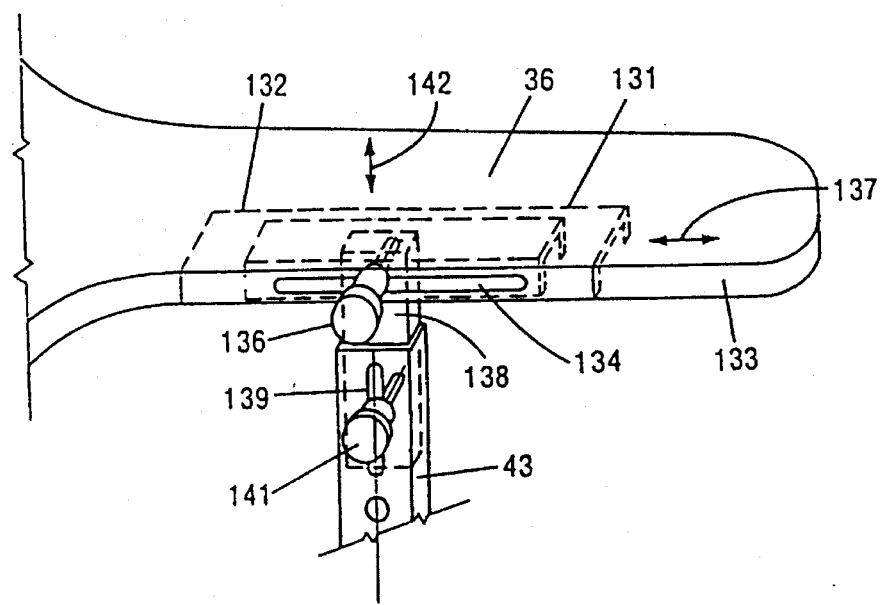
FIG. 9 is an enlarged, fragmentary, top perspective view of an alternate arm rest portion for the seat assembly of FIG. 8.

FIG. 9 illustrates that it is further preferable to be able to adjust upper back support 23 both vertically and horizontally relative to seat 22. This allows the user to adjust the seat to better mate with the user's anatomy. Arm rest 36, which mounts the seat back and lumbar region support to the chair assembly, includes a guide channel 131 which slidably receives a second channel-shaped member 132. An inner side 133 of arm rest 36 is slotted at 134 for receipt of a securement means or adjustment knob assembly 136 therethrough. Securement knob assembly 136 is coupled to slidable channel member 132 and can be used to releasably secure the position of channel member 132 along slot 134. This affords the user the ability to adjust the fore and aft position of back rest 23 and lumbar support member 113, as indicated by arrows 137.

Vertical adjustment is provided in a similar manner in that post member 138 is slidably received inside vertical support member 43. A slot 139 and locking knob 141 are provided so as to enable selective locking of the movable post 138 inside the frame member 43. This enables vertical adjustment of the back rest 23, as indicated by arrows 142. It should be noted that vertical adjustment of back rest 23 will not change the relative position between seat 22 and lumbar region support member 113.

Figure 10:
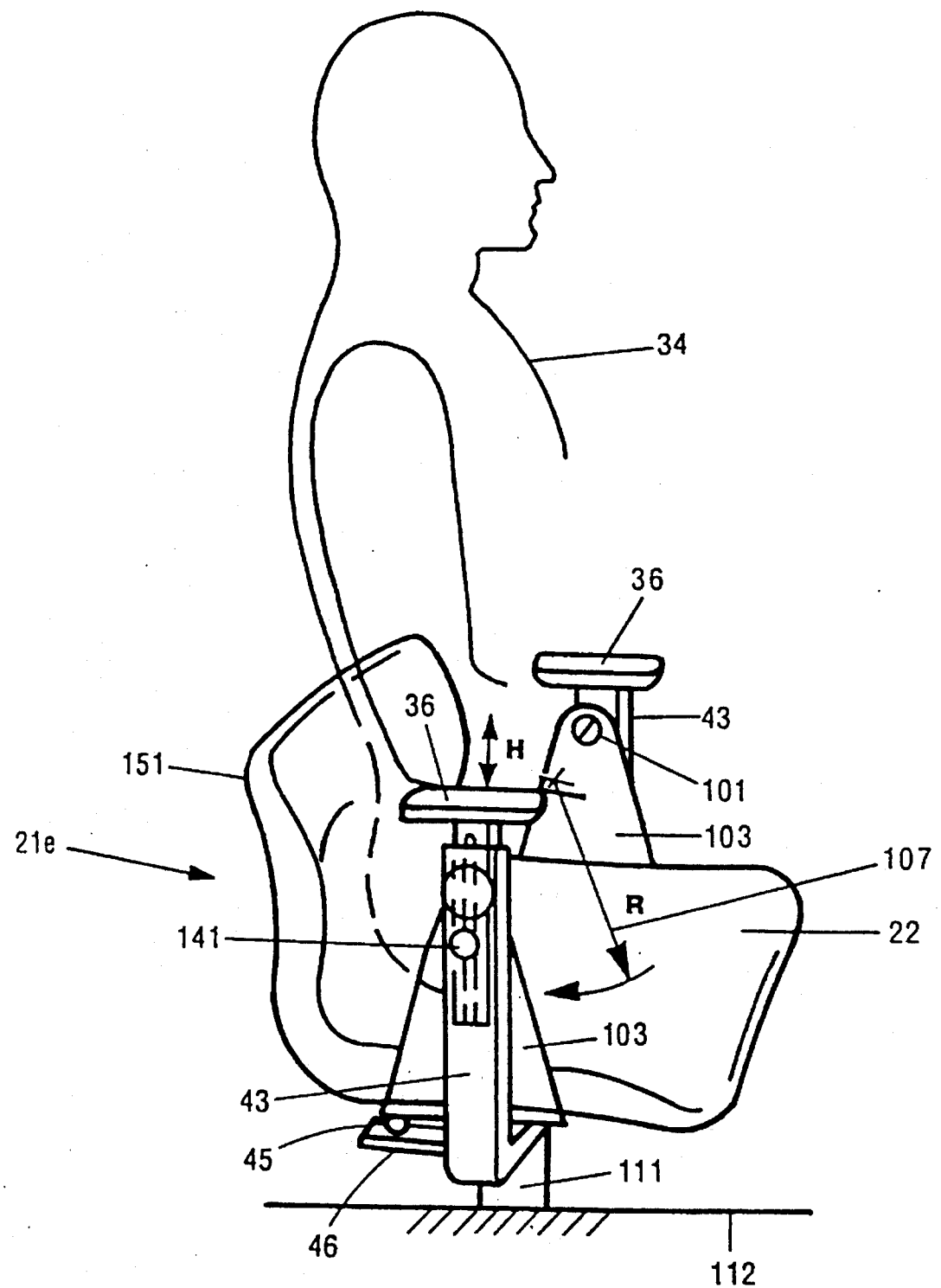
FIG. 10 is a schematic, top perspective view of a further alternative embodiment of the seat assembly of the present invention.

Seat assembly 21e of FIG. 10 includes a U-shaped mounting structure of the type shown in FIG. 8. Telescoped within U-shaped upright support posts 43 are arm rests 36 which are adjustably locked in place by locking knob assembly 141. Seat 22 is pivoted about horizontal pivot pins 101 for movement in an arcuate path, as indicated by arrow 107. Seat 22 includes a lumbar engaging lower back support portion 151, which is integrally formed with and pivots with seat 22. The user can use his arms or elbows to adjust or control position of the seat by pushing off of arm rest 36. The arm rests, therefore, act as stationary support means for control of the positioning of the seat to enable dynamic adjustment of the lumbar region so as to maintain comfort and decrease fatigue. In the form of the seat assembly of FIG. 8, the armrests perform a similar function in that they are stationary and provide a support for controlling seat positioning. Similarly, the seat back 23 is stationary and can be used in the seat adjusting process.

Figure 11:
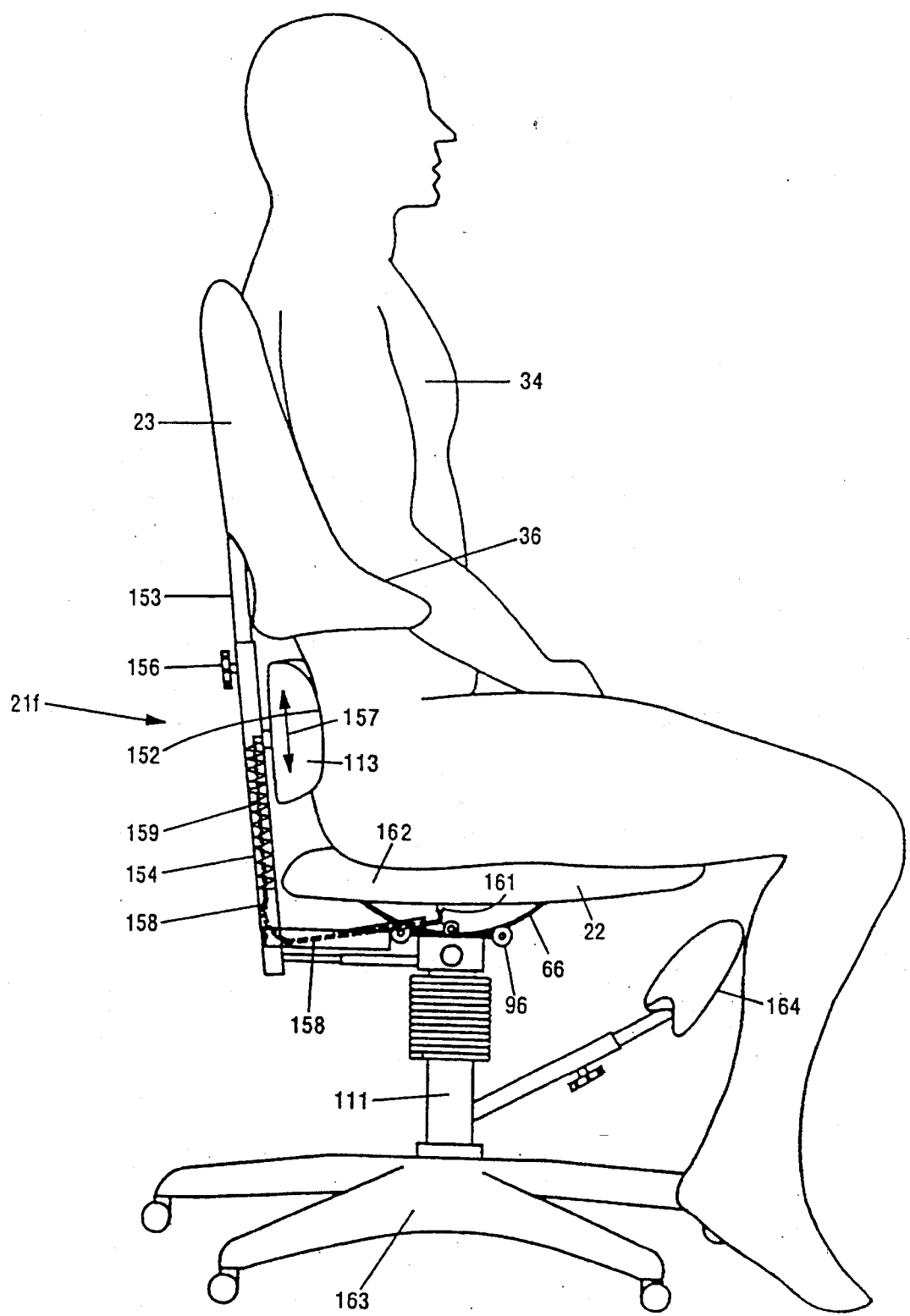
FIG. 11 is a schematic, side elevation view of still another alternative embodiment of the seat assembly of the present invention.

Seat assembly 21e of FIG. 10 is shown mounted on a post 111 that can include a pivotal mounting assembly (not shown). The post can either be connected to a rolling support, as shown in FIG. 11, or can be directly mounted to a fixed support surface 112. In this configuration seat 22 stops at cushioning stop 45 which is securely mounted to rigid plate 46, that in turn is attached to post 111. This allows rearward rotation of seat 22 only from a horizontal position. Seat rotation, therefore, is activated when the user's body 34 moves from vertical to a forward leaning posture.

FIG. 11 illustrates a form of office chair using the seating assembly 21f of the present invention. Seat 22 carries a pair of tracks or guide rails 66, which are engaged by roller elements 96 in a manner similar to the seat of FIGS. 3A–3C and FIG. 4. An upper back rest 23 is provided which engages the upper back of the person 34 seated on the seat. Lower back rest, or lumbar support rest, 113 engages the person's back in the lumbar region 152. Upper back rest 23 includes arm rest members 36 integrally formed therewith, and the upper back rest is mounted on a central post 153 which is telescoped inside back rest support post 154. An adjustment assembly 156 allows selective adjustment and locking of the height of the upper back rest and arm rest.

In order to provide enhanced comfort, lumbar region back support 113 is slidably mounted to post member 154 for vertical reciprocation, as indicated by arrows 157. Seat 22 is coupled to lower back support 113 by a flexible link 158, which pulls against a biasing means, such as a compression spring 159. Spring 159 urges lumbar support member 113 in an upward direction, while link 158, coupled to seat 22 at 161, pulls the lumbar support member downwardly when seat 22 tilts down at rear end 162 of the seat. In the chair shown in FIG. 11, seat assembly 21f is mounted on a post 111 for pivotal movement, and the post 111 is carried by a standard rolling leg assembly 163. Additionally, a shin and foot support assembly 164 is shown mounted to post 111 for rotation thereabout and provides means for selected support of the feet or shins of the person using the chair.

The method of the present invention is comprised of the step of employing a seat assembly in a motor vehicle which is mounted for movement in a direction along the fore-aft axis of the vehicle along an upwardly concaved, arcuate path having a radius of curvature maintaining the buttocks of the person seated in the seat in contact with the seat. The contact ensures frictional forces which will decelerate the lower mass of the person, and the seat movement decreases the rate of deceleration of the person by increasing the distance for stopping, as well as converting linear momentum into angular momentum positioning the person's knees between the steering wheel and the dash assembly. The mounting step preferably is accomplished by mounting the seat for substantially unrestrained movement along an upwardly concaved, arcuate path during rapid vehicle deceleration by an amount resulting in a substantial frictional force between the seat and the rider in the seat. The arcuate path has a radius of curvature between about 4 and about 15 inches, and most preferably between 10 and 11 inches. The method prevents submarining of the person's lower body underneath any passenger restraining devices, and even if no passenger restraining device is employed, effects deceleration of the person's lower mass in a safer fashion.

The present method also may include the step of mounting a lumbar portion of the seat back for movement in response to movement of the seat to enhance frictional contact between the person and the seat during high deceleration stops. In the most preferred form the seat is mounted for curvilinear movement about two centers of curvature having different radii which are tangent to a common plane. The foremost portion of the path has a radius of curvature greater than the aft most portion, which enhances frictional contact and accelerates the conversion of linear into angular momentum as the seat moves forward.

Additionally, the method preferably includes the step of absorbing deceleration loading on the seat by shock absorber means which is resiliently displaceable at a deceleration force over a threshold of acceleration less than the threshold at which spinal column damage will occur.

What is claimed is:

1. A seat assembly for a vehicle comprising:

a back support having a vertically displaceable lumbar support portion;

back support mounting assembly coupled to said back support and formed for mounting of said back support in a stationary position in said vehicle in a generally vertical orientation;

a seat;

seat mounting assembly coupled to said seat and formed for mounting said seat in a vehicle in a generally horizontal orientation for inertia-driven movement of said seat in fore and aft directions relative to said vehicle along an upwardly concaved arcuate path having an axis of curvature located above said seat and in front of said lumbar support portion; and said back support mounting assembly being coupled to one of said seat mounting assembly and said seat for vertical displacement of said lumbar portion in response to movement of said seat in a fore and aft direction.

2. The seat assembly for a vehicle as defined in claim 1 wherein, said back support mounting assembly is coupled to produce downward displacement of said lumbar portion upon tilting of said seat away from a fore end of said vehicle during movement along said path.

3. The seat assembly for a vehicle as defined in claim 1 wherein, said back support having a top, and said concaved arcuate path has a radius of curvature greater than about 4 inches, and said axis of curvature is located below said top of said back support.

4. The seat assembly for a vehicle as defined in claim 3 wherein, said radius of curvature is in the range of about 4 inches to about 15 inches.

5. A seating apparatus for humans comprising:

a. a seat;

b. a seat frame including a pair of load supporting posts extending upwardly to a position proximate said seat on opposite sides of said seat;

c. a seat mounting assembly pivotally mounting said seat to said posts at positions above said seat in a near horizontal orientation relative to a support surface for movement of said seat along an upwardly concave arcuate path having a center of curvature below the thorax of a person when seated on said seat;

d. a lower back support having opposite sides and positioned to engage the person's lower back in the lumbar region, said lower back support being movably mounted to one of said seat and said seat mounting assembly for vertical movement in response to movement of said seat to follow the change in elevation of the seated person's lumbar region as said seat moves;

e. an upper back support movably mounted to said seat frame and extending vertically to a position above and around said opposite sides of said lower back support; and f. means for selective securement of the height of said upper back support relative to said seat frame.

6. The seating apparatus as defined in claim 5 wherein, said lower back support is mounted to said upper back support for guided vertical reciprocation.

7. The seating apparatus as defined in claim 5 wherein, said upper back support includes arm support members on opposite sides of said seat, said upper back support is mounted to said seat frame for selective securement of the height thereof in a plurality of fixed relationship relative to said seat; and said lower back support is mounted for vertical reciprocation to said upper back support.

* * * * *

UNITED STATES PATENT AND TRADEMARK OFFICE
CERTIFICATE OF CORRECTION

PATENT NO. : 5,460,427
DATED : October 24, 1995
INVENTOR(S) : Hector Serber

It is certified that error appears in the above-indentified patent and that said Letters Patent is hereby corrected as shown below:

Column 9, line 6, delete "armrests" and insert therefor --arm rests--.

Column 9, line 8, immediately following "axis." insert --[new paragraph] Seat--.

Column 9, line 16, immediately following "pins" insert --101--.

Column 9, line 20, delete "armrest" and insert therefor --arm rest--.

Column 9, line 55, immediately following "36." insert --[new paragraph]--.

Column 10, line 16, delete "armrest" and insert therefor --arm rest--.

Column 11, line 32, delete "armrests" and insert therefor --arm rests--.

UNITED STATES PATENT AND TRADEMARK OFFICE
CERTIFICATE OF CORRECTION

PATENT NO. : 5,460,427
DATED : October 24, 1995
INVENTOR(S) : Hector Serber

It is certified that error appears in the above-indentified patent and that said Letters Patent is hereby corrected as shown below:

Column 12, line 18, immediately following "momentum" insert --and--.

Signed and Sealed this

Fifth Day of March, 1996

Attest:

BRUCE LEHMAN

*Attesting Officer*    *Commissioner of Patents and Trademarks*